(12) United States Patent
Ou et al.

(10) Patent No.: US 8,613,367 B2
(45) Date of Patent: Dec. 24, 2013

(54) SEALING ASSEMBLY AND METHOD OF MAKING SUCH ASSEMBLY

(75) Inventors: Duan Li Ou, Northboro, MA (US);
Scott R Johnson, Troy, NY (US);
Charles D. Klann, Lodi, WI (US);
Leland E Moll, Schuylerville, NY (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 658 days.

(21) Appl. No.: 12/201,694

(22) Filed: Aug. 29, 2008

(65) Prior Publication Data
US 2010/0051575 A1   Mar. 4, 2010

(51) Int. Cl.
*B65D 41/00* (2006.01)

(52) U.S. Cl.
USPC ........ 220/359.3; 604/905; 604/415; 215/232; 215/247

(58) Field of Classification Search
USPC ......... 215/232, 247, 249, 320, 324, 341, 346, 215/349, 350; 156/60, 230, 241, 272.2, 156/274.8; 604/415, 905; 220/359.3
See application file for complete search history.

(56) References Cited

U.S. PATENT DOCUMENTS

| | | | |
|---|---|---|---|
| 4,499,148 A * | 2/1985 | Goodale et al. | 428/447 |
| 5,482,591 A * | 1/1996 | Reo | 156/306.6 |
| 5,647,939 A | 7/1997 | Gee et al. | |
| 6,017,317 A * | 1/2000 | Newby et al. | 600/573 |
| 6,234,335 B1 * | 5/2001 | Gee et al. | 215/247 |
| 6,648,853 B1 * | 11/2003 | McEntee | 604/88 |
| 6,696,352 B1 * | 2/2004 | Carr et al. | 438/458 |
| 6,752,965 B2 * | 6/2004 | Levy | 422/570 |
| 7,967,034 B2 * | 6/2011 | Py | 141/11 |
| 7,980,276 B2 * | 7/2011 | Py | 141/11 |
| 8,057,762 B2 * | 11/2011 | Kacian et al. | 422/570 |
| 8,387,811 B2 * | 3/2013 | Livingston et al. | 215/253 |
| 2002/0131902 A1 * | 9/2002 | Levy | 422/99 |
| 2007/0009429 A1 * | 1/2007 | Simon | 424/1.11 |

FOREIGN PATENT DOCUMENTS

| | | |
|---|---|---|
| EP | 0450098 A1 | 10/1991 |
| EP | 0512612 A1 | 11/1992 |
| JP | 7323072 A | 12/1995 |
| JP | 2001-198189 A | 7/2001 |
| WO | 2008052170 A2 | 5/2008 |

* cited by examiner

*Primary Examiner* — Mickey Yu
*Assistant Examiner* — Kareen Rush
(74) *Attorney, Agent, or Firm* — Abel Law Group, LLP; Chi Suk Kim

(57) ABSTRACT

The disclosure is directed to a sealing assembly. The sealing assembly includes a cap having a top surface and a bottom surface, an adhesive layer adjacent the bottom surface of the cap, and a septum adjacent to the adhesive layer. The adhesive layer includes a self-bonding silicone composition and the septum includes at least one fluoropolymer layer. The disclosure is further directed to methods for making the aforementioned sealing assembly.

14 Claims, 3 Drawing Sheets

SEALING ASSEMBLY AND METHOD OF MAKING SUCH ASSEMBLY

FIELD OF THE DISCLOSURE

This disclosure, in general, relates to a sealing assembly and a method for making a sealing assembly.

BACKGROUND

Septa bonded caps are used for a variety of applications where sterility is needed. For instance, septa bonded caps are typically used in the medical industry, analytical industry, and biochemical industry. Typical commercial assemblies include a septum and a cap where the septum includes a multilayer assembly.

Multilayer assemblies desirably improve the sealing assembly using a variety of polymeric materials, metallic materials, glass, or a combination thereof. Sealing materials for the septum typically include silicone polymers and butyl rubber. Typically, a sealing material is used in addition to a metal layer and/or a polymer layer. To improve the bond strength between the cap and the septum, a primer is needed to adhere the septum to the cap. Further, the cap may also be surface treated. Such additions to the assembly process increase the expense of the cap. Furthermore, the primers typically include impurities that compromise the integrity of the sealing assembly. This may lead to contamination of the material to which it packaged.

As such, improved sealing assemblies and method of manufacturing sealing assemblies would be desirable.

SUMMARY

In a particular embodiment, a sealing assembly includes a cap having a top surface and a bottom surface, an adhesive layer adjacent the bottom surface of the cap, and a septum adjacent to the adhesive layer. The adhesive layer includes a self-bonding silicone composition and the septum includes at least one fluoropolymer layer.

In another embodiment, a sealing assembly includes a cap having a top surface and a bottom surface and a septum adjacent to the bottom surface of the cap. The septum includes an adhesive layer adjacent to the bottom surface of the cap and at least one fluoropolymer layer adjacent to the adhesive layer. The adhesive layer includes a self-bonding silicone composition.

In another exemplary embodiment, a method of making a sealing assembly includes providing a cap having a top surface and a bottom surface, providing an adhesive layer between the bottom surface of the cap and a septum, inserting the septum into the bottom surface of the cap, and heating the sealing assembly to provide an adhesive bond between the cap and the septum. The adhesive layer includes a self-bonding silicone composition and the septum includes a fluoropolymer layer.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

In a particular embodiment, a sealing assembly includes a cap having a top surface and a bottom surface, an adhesive layer adjacent the bottom surface of the cap, and a septum adjacent to the adhesive layer. The adhesive layer includes a self-bonding silicone composition and the septum includes at least one fluoropolymer layer. The incorporation of the adhesive layer provides a sealing assembly wherein the septum adheres to the cap with desirable bond strength.

Figure 1:
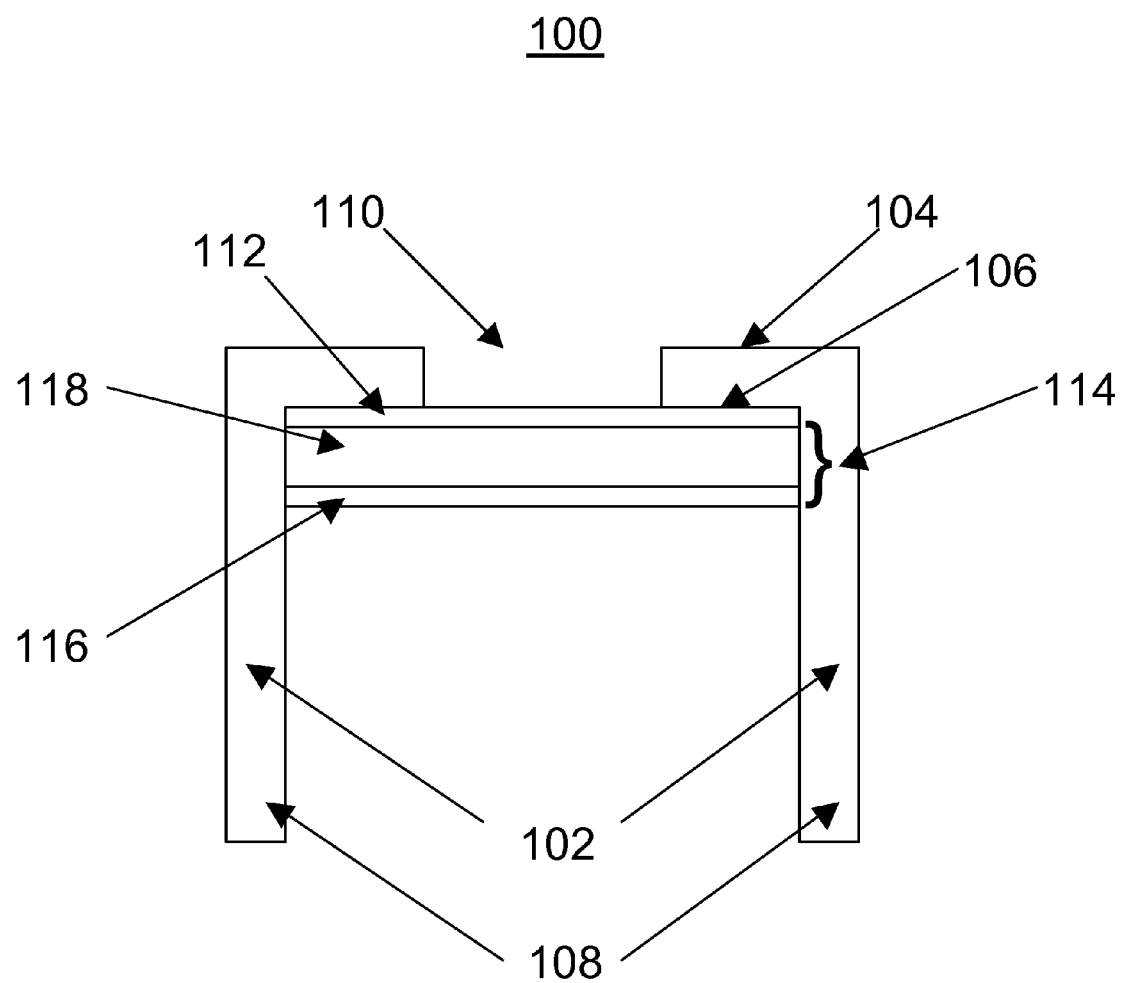
FIGS. 1 and 2 include illustrations of exemplary sealing assemblies.

An exemplary sealing assembly 100 is illustrated in FIG. 1. Sealing assembly 100 includes a cap 102. The cap 102 has a top surface 104 and a bottom surface 106. Further, the cap 102 includes a sidewall 108 that extends from the top surface 104 and bottom surface 106 of the cap 102. In a further embodiment, the cap 102 may include an aperture 110, particularly suitable for sample insertion/removal. In an embodiment, the cap 102 may be closed (not shown), i.e. does not contain an aperture. An adhesive layer 112 directly contacts the bottom surface 106 of the cap 102. The adhesive layer 112 includes any suitable material to adhere a septum 114 to the bottom surface 106 of the cap 102. The septum 114 includes a fluoropolymer layer 116 that overlies the adhesive layer 112. In an embodiment, a silicone layer 118 may be disposed between the fluoropolymer layer 116 and the adhesive layer 112.

Figure 2:
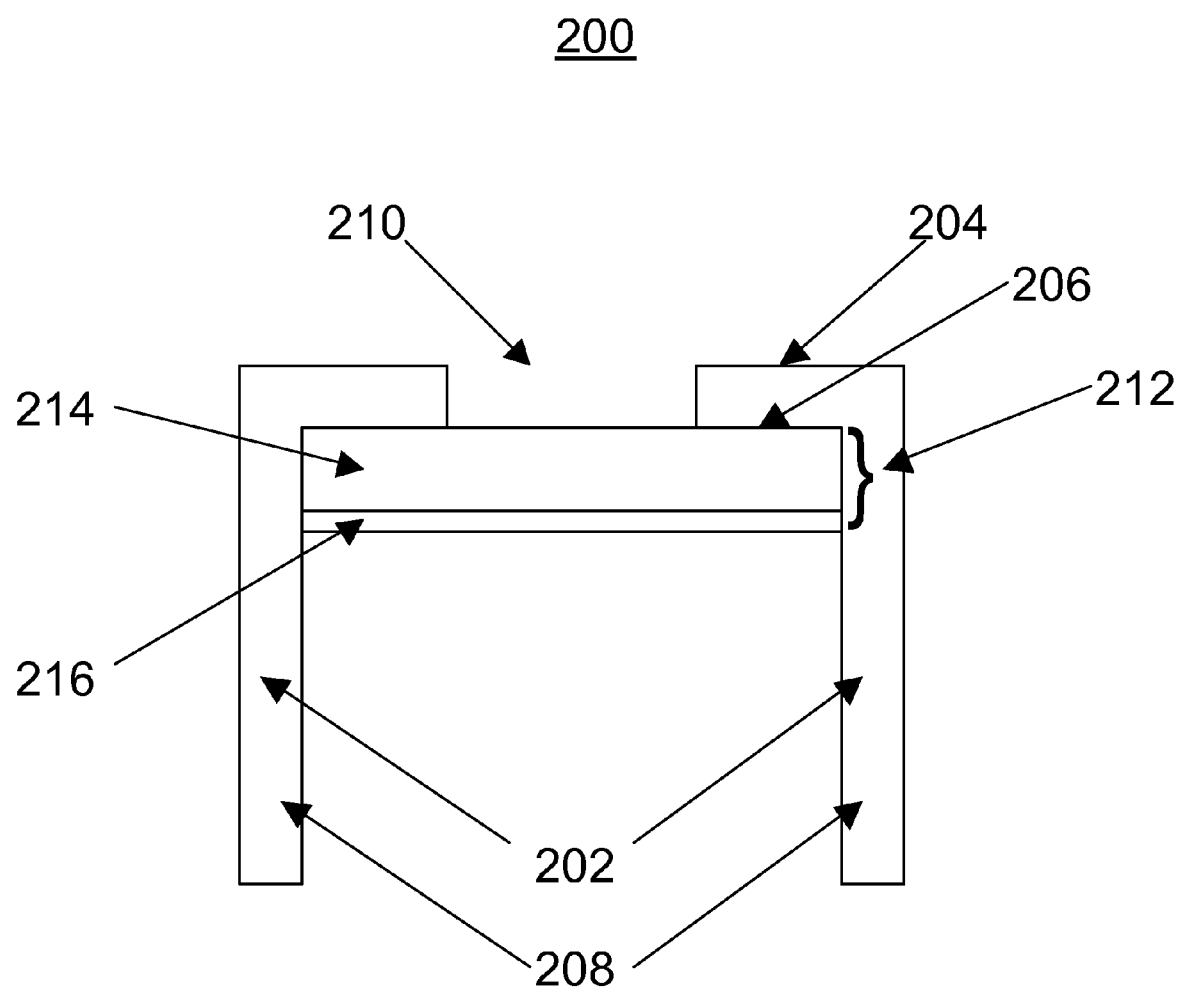

An exemplary sealing assembly 200 is illustrated in FIG. 2. Sealing assembly 200 includes a cap 202. The cap 202 has a top surface 204 and a bottom surface 206. Further, the cap 202 includes a sidewall 208 that extends from the top surface 204 and bottom surface 206 of the cap 202. In a further embodiment, the cap 202 may include an aperture 210, particularly suitable for sample insertion/removal. In an embodiment, the cap 202 may be closed (not shown), i.e. does not contain an aperture. In FIG. 2., the sealing assembly includes a septum 212, wherein an adhesive layer 214 is an integral part of septum 212 and is in direct contact with the bottom surface 206 of cap 202. The septum 212 includes a fluoropolymer layer 216. The adhesive layer 214 is in direct contact with fluoropolymer layer 216.

The cap may be any suitable material used for an application where sterility is required, for instance, in medical applications and analytical applications. Suitable materials for the cap include, for example, polymers, metallics, or combinations thereof. Typical polymers include thermoplastics and thermosets. In an embodiment, the cap is polycarbonate, phenolic, polypropylene, polyethylene, aluminum, stainless steel, or any combination thereof. Caps may include any suitable cap closures, for example, crimp seal closure caps, snap cap closures, and screw cap closures. Caps may also include open top cap closures as well as closed top cap closures.

In an exemplary embodiment, the adhesive layer is a self-bonding silicone composition. Self-bonding silicone compositions are typically silicone compositions that adhere to other surfaces without the need for a primer between the self-bonding silicone composition and the surface to which it adheres. In particular, the self-bonding silicone composition is a silicone composition that adheres to the bottom surface of the cap without the need for a primer. Typical self-bonding silicone compositions include a polyalkylsiloxane and an adhesion promoter. Polyalkylsiloxanes include, for example, silicone polymers formed of a precursor, such as dimethylsiloxane, diethylsiloxane, dipropylsiloxane, methylethylsiloxane, methylpropylsiloxane, or combinations thereof. In a particular embodiment, the polyalkylsiloxane includes a polydialkylsiloxane, such as polydimethylsiloxane (PDMS).

In a particular embodiment, the polyalkylsiloxane is a silicone hydride-containing polydimethylsiloxane. In a further embodiment, the polyalkylsiloxane is a vinyl-containing polydimethylsiloxane. In yet another embodiment, the silicone polymer is a combination of a hydride-containing polydimethylsiloxane and a vinyl-containing polydimethylsiloxane. In an example, the polyalkylsiloxane is non-polar and is free of halide functional groups, such as chlorine and fluorine, and of phenyl functional groups. Alternatively, the polyalkylsiloxane may include halide functional groups or phenyl functional groups.

Typically, the polyalkylsiloxane is elastomeric. For example, the durometer (Shore A) of the polyalkylsiloxane may be less than about 75, such as about 1 to 70, about 20 to about 50, about 30 to about 50, about 40 to about 50, or about 1 to about 5.

The self-bonding silicone composition may further include a catalyst and other optional additives. Exemplary additives may include, individually or in combination, fillers, inhibitors, colorants, and pigments. In an embodiment, the self-bonding silicone composition is a platinum catalyzed polyalkylsiloxane. Alternatively, the self-bonding silicone composition may be a peroxide catalyzed polyalkylsiloxane. In another example, the self-bonding silicone composition may be a combination of a platinum catalyzed and peroxide catalyzed polyalkylsiloxane. The polyalkylsiloxane may be a room temperature vulcanizable (RTV) formulation, a gel, or a foam. In an example, the polyalkylsiloxane may be a liquid silicone rubber (LSR) or a high consistency gum rubber (HCR). In a particular embodiment, the polyalkylsioxane may be a partially cured high consistency gum rubber (HCR). "Partially cured" as used herein refers to a material that is under cured, such as not greater than about 75% cure, or not greater than about 50% cure, to maintain surface tackiness of the high consistency gum rubber (HCR).

In an embodiment, the adhesion promoter used in the adhesive layer may include vinyl siloxane or silsesquioxane. In an example, the silsesquioxane includes an organosilsesquioxane or a vinyl-containing silsesquioxane. For example, the vinyl-containing silsesquioxane may include $RSiO_{3/2}$ units, wherein R is a vinyl group, an alkyl group, an alkoxy group, a phenyl group, or any combination thereof. Typically, the silsesquioxane has a vinyl content of at least about 30.0% by weight. In an embodiment, the alkyl or alkoxy group includes a $C_{1-6}$ hydrocarbon group, such as a methyl, ethyl, or propyl group. The adhesion promoter may include $R_2SiO_{2/2}$ units, $R_3SiO_{1/2}$ units and $SiO_{4/2}$ units, wherein R is an alkyl radical, alkoxy radical, phenyl radical, or any combination thereof. In an embodiment, the vinyl-containing silsesquioxane may include pre-hydrolyzed silsesquioxane prepolymers, monomers, or oligomers.

In addition, the silsesquioxane may have desirable processing properties, such as viscosity. In particular, the viscosity may provide for improved processing in situ, such as during silicone formulation mixing or extrusion. For example, the viscosity of the silsesquioxane may be about 1.0 centistokes (cSt) to about 8.0 cSt, such as about 2.0 cSt to about 4.0 cSt, or about 3.0 cSt to about 7.0 cSt. In an example, the viscosity of the silsesquioxane may be up to about 100.0 cSt, or even greater than about 100.0 cSt.

In an embodiment, the adhesion promoter may include an ester of unsaturated aliphatic carboxylic acids. Exemplary esters of unsaturated aliphatic carboxylic acids include $C_{1-8}$ alkyl esters of maleic acid and $C_{1-8}$ alkyl esters of fumaric acid. In an embodiment, the alkyl group is methyl or ethyl. In a particular embodiment, the adhesion promoter is dimethyl maleate, diethyl maleate, or any combination thereof In an embodiment, one or more of the above-mentioned adhesion promoters may be added to the silicone polymer. For instance, the adhesion promoter may include a mixture of the silsesquioxane and the ester of unsaturated aliphatic carboxylic acid. In an embodiment, the silsesquioxane is an organosilsesquioxane wherein the organo group is a $C_{1-18}$ alkyl. In an embodiment, the adhesion promoter is a mixture of the organosilsesquioxane and diethyl maleate. In another embodiment, the adhesion promoter is a mixture of the organosilsesquioxane and dimethyl maleate. In a particular embodiment, the mixture of the organosilsesquioxane and the ester of unsaturated aliphatic carboxylic acids has a weight ratio of about 1.5:1.0 to about 1.0:1.0.

Generally, the adhesion promoter is present in an effective amount to provide a self-bonding silicone composition which bonds to the bottom surface of the cap. In an embodiment, an "effective amount" is about 0.1 weight % to about 5.0 weight %, such as about 0.1 wt % to about 3.0 wt %, such as about 1.0 wt % to about 3.0 wt %, or about 0.2 wt % to about 1.0 wt % of the total weight of the silicone polymer.

Typically, the adhesive layer has a thickness of about 20 micrometers to about 200 micrometers. Commercially available self-bonding silicone compositions are available from Wacker Silicones of Adrian, Mich., Product Serial Nos. LR 3070, LR 3071, LR 3072, LR3074 and LR 3077. Self-bonding silicone compositions are also available from ShinEtsu of Tokyo, Japan, Product Serial Nos KE2090 and KE2095 and Momentive Company, product No. LIM8040.

In an example, the septum includes a fluoropolymer layer. An exemplary fluoropolymer may be formed of a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. For example, the fluoropolymer is polytetrafluoroethylene (PTFE).

Further exemplary fluoropolymers include a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. For example, the fluoropolymer may include FEP. In a further example, the fluoropolymer may include PVDF. In an exemplary embodiment, the fluoropolymer may be a polymer crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers used herein may be obtained from Daikin (Japan) and DuPont (USA). In particular, FEP fluoropolymers are commercially available from Daikin, such as NP-12X.

In an embodiment and as seen in FIG. 1, the septum further includes an optional silicone layer. In an embodiment, the optional silicone layer is disposed between the adhesive layer and the fluoropolymer layer of the septum. For instance, the silicone layer may be any suitable silicone elastomer used for sterile application, such as a high consistency gum rubber (HCR) or liquid silicone (LSR). The silicone elastomer layer may have a thickness of about 0.010 inches to about 0.250 inches.

Typically, the septum has a total thickness of not greater than about 0.135 inches to about 0.250 inches. Any suitable number of layers may be envisioned.

The sealing assembly may be formed through a method wherein the cap is provided. In general, the self-bonding silicone composition exhibits desirable adhesion to the bottom surface of the cap without further treatment of the bottom surface of the cap. Alternatively, the bottom surface of the cap may be treated to further enhance adhesion. In an embodiment, the adhesion between the cap and the septum may be improved through the use of a variety of commercially available surface treatments. An exemplary surface treatment may include chemical etch, physical-mechanical etch, plasma etch, corona treatment, chemical vapor deposition, or any combination thereof. In an embodiment, plasma etching includes reactive plasmas such as hydrogen, oxygen, acetylene, methane, and mixtures thereof with nitrogen, argon, and helium. Corona treatment may include the reactive hydrocarbon vapors such as acetone.

Figure 3:
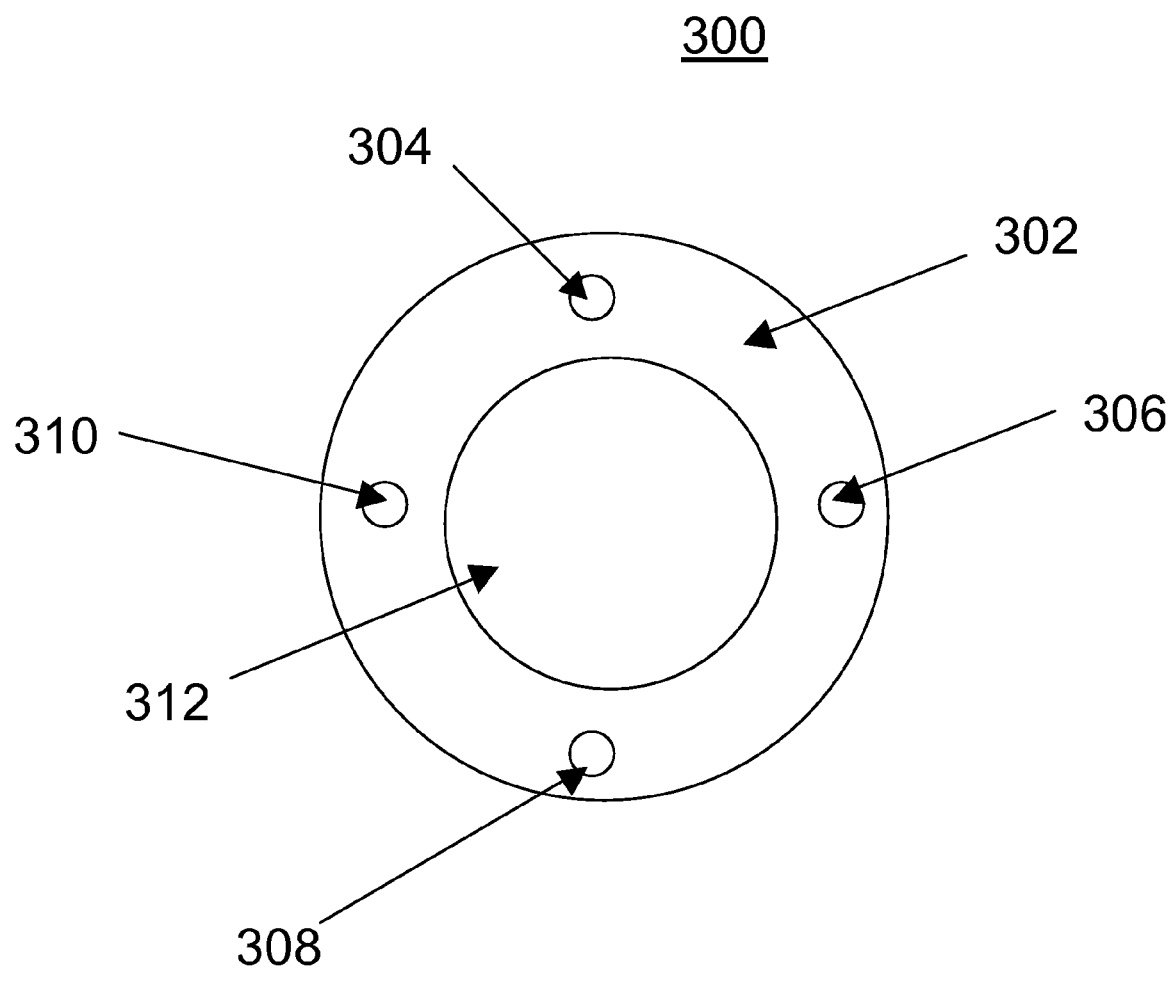
FIG. 3 includes an exemplary illustration of a bottom surface of a cap.

An adhesive layer is provided between the bottom surface of the cap and the septum. The adhesive layer may or may not be integrally formed with the septum. For instance, as seen in FIG. 1, the adhesive layer may be formed separately and fixed within the cap. For instance, the adhesive layer may be dispensed as a viscous liquid or as an extrusion. In a particular embodiment, the adhesive layer may be dispensed on the bottom surface of the cap. In an embodiment, the adhesive layer includes a liquid silicone rubber (LSR) and is dispensed as a viscous liquid. One or more dosing positions may be used to form an adhesive bond between the cap and the septum. Any number of positions or amount of the self-bonding silicone composition used can be envisioned, with the proviso that an adhesive bond is formed between the cap and the septum. As seen in FIG. 3, cap 300 is shown. The view of the bottom surface 302 of cap 300 illustrates multiple spots 304, 306, 308, and 310 where the adhesive layer may be dosed as a viscous liquid. The cap 300 is an open top cap having an aperture 312. In an embodiment, the adhesive layer may be applied on the septum.

As seen in FIG. 2, the adhesive layer is an integral layer of the septum. In an embodiment, the adhesive layer is dispensed as an extrusion. For instance, the adhesive layer may be extruded directly on the fluoropolymer layer of the septum. In an embodiment, the adhesive layer includes a high consistency gum rubber (HCR) and is extruded directly on the fluoropolymer layer of the septum. In an embodiment, the adhesive layer is a partially cured high consistency gum rubber and is extruded directly on the fluoropolymer layer of the septum. The septum may then be cut to fit within the bottom surface of the cap. Any configuration or dimension of the cap and septum may be envisioned, with the proviso that the cap and septum have a friction fit.

In an embodiment and as seen in FIG. 1, a silicone layer is provided as an integral part of the septum. The silicone layer is provided and disposed between the adhesive layer and the fluoropolymer layer of the septum. In an embodiment, the optional silicone layer is provided prior to inserting the septum into the bottom surface of the cap. In a particular embodiment, the optional silicone layer is provided prior to providing the adhesive layer between the bottom of the cap and the septum. When present, the silicone layer may be disposed by any reasonable method such as by extrusion. In an embodiment, the silicone layer is extruded on the fluoropolymer layer as an integral part of the septum and prior to inserting the septum into the bottom surface of the cap.

Once the adhesive layer is provided, the septum is inserted into the bottom surface of the cap. The septum is typically inserted within the cap with sufficient pressure to create a bond strong enough between the cap and the septum to hold the septum in place. In an embodiment, the septum is inserted within the cap at a pressure of at least about 15 psi, such as greater than about 20 psi for a time of at least 1 second.

The sealing assembly is then subjected to cure treatment to create an adhesive bond between the septum and the bottom surface of the cap. Exemplary cure treatments include thermal treatment, radiative curing, or any combination thereof. Thermal treatment typically occurs at a temperature of about 125° C. to about 200° C. In an embodiment, the thermal treatment is at a temperature of about 150° C. to about 180° C. Typically, the thermal treatment occurs for a time period of about 5 minutes to about 10 hours, such as about 10 minutes to about 30 minutes, or alternatively about 1 hour to about 4 hours.

In an embodiment, radiation crosslinking or radiative curing may be performed once the sealing assembly is formed. The radiation may be effective to crosslink the self-bonding silicone composition. The intralayer crosslinking of polymer molecules within the self-bonding silicone composition provides a cured self-bonding silicone composition and imparts structural strength to the self-bonding silicone composition of the sealing assembly. In addition, radiation may effect a bond between the septum and the cap, such as through interlayer crosslinking. In a particular embodiment, the combination of interlayer crosslinking bonds between the cap and the septum present an integrated sealing assembly that is highly resistant to delamination and yet, is physically substantial for convenient handling and deployment of the sealing assembly. In a particular embodiment, the radiation may be ultraviolet electromagnetic radiation having a wavelength between 170 nm and 400 nm, such as about 170 nm to about 220 nm. In an example, crosslinking may be effected using at least about 120 $J/cm^2$ radiation.

Once formed and cured, particular embodiments of the above-disclosed sealing assembly advantageously exhibit desired properties such as increased bonding strength and no leak path at the interface of the septum and the cap, i.e. seal interface. For example, the sealing assembly may have a bonding strength between the cap and septum of greater than about 30 psi, such as greater than about 60 psi, or even greater than about 100 psi. Further, the sealing assembly provides a seal that is free of bubbling between the septum and the cap. The sealing assembly eliminates the leak path between cap and septum, which causes contamination and microbial growth. Further, the permanent bond between septum and cap prevents the septum from falling out of the cap during an automated assembly process.

EXAMPLE 1

This Example illustrates the procedure to make a PTFE/silicone septa bonded polypropylene cap. A 27 mm polypropylene cap with 14 mm hole on the top is provided. Silicone rubber is bonded onto a thin layer of surface modified PTFE film during its vulcanization process to form PTFE/silicone laminate. PTFE/silicone septa (27 mm) are cut from this laminate by a standard method. The interior portion of the top of the cap is treated by corona discharge using a hand held corona torch (Electric Tecno Model BD20) at a distance of 20 mm for approximately 1 second. Pre-mixed self-bonding liquid silicone rubber (0.005 g) is applied four times onto the corona treated surface using a hand held adhesive dispensing system (Glenmarc-PD-2000). The self-bonding silicone spots are 90 deg away from each other on the inner surface of the cap, as illustrated in FIG. 3. The septum is then inserted into the cap and approximately 20 psi pressure is applied to the septum for 1 second to hold it into the place. The final combination is then placed into a 125° C. oven for 5 minutes to allow the development of permanent bonding between the septum and cap. The leak path between septum and cap is completely eliminated in the resulting fixture.

EXAMPLE 2

This Example illustrates the procedure to make a PTFE/silicone septa bonded aluminum crimp cap. A 27 mm aluminum crimp cap with a 10 mm hole on the top is provided. PTFE/silicone septa (27 mm) are cut from the laminate described in Example 1 by standard method. Pre-mixed self-bonding liquid silicone rubber (0.005 g) is applied four times onto the inner surface of the cap using a hand held adhesive dispensing system (Glenmarc-PD-2000). The self-bonding silicone spots are 90 deg away from each other, as illustrated in FIG. 3. The septum is then inserted into the cap and approximately 20 psi pressure is applied to the septum for 1 second to hold it into the place. The final combination is then placed into a 175° C. oven for 5 minutes to allow the development of permanent bonding between septum and aluminum crimp cap. The leak path between septum and cap is completely eliminated in the resulting fixture.

EXAMPLE 3

This Example illustrates the procedure to make a PTFE/silicone septa bonded stainless steel crimp cap. A 27 mm stainless steel crimp cap with 8 mm hole on the top is provided. 27 mm PTFE/silicone septa are cut from the laminate described in Example 1 by standard method. Pre-mixed self-bonding liquid silicone rubber (0.005 g) is applied four times onto the inner surface of the cap using a hand held adhesive dispensing system (Glenmarc-PD-2000). The self-bonding silicone spots are 90 deg away from each other, as illustrated in FIG. 3. The septum is then inserted into the cap and approximately 20 psi pressure is applied to the septum for 1 second to hold it into the place. The final combination is then placed into a 175° C. oven for 5 minutes to allow the development of permanent bonding between septum and stainless steel crimp cap. The leak path between septum and cap is completely eliminated in the resulting fixture.

EXAMPLE 4

This Example illustrates the procedure to make a PTFE/silicone septa bonded phenolic cap. A 18 mm phenolic cap is provided. A 18 mm PTFE/silicone septum is cut from PTFE/silicone laminate described in Example 1. Pre-mixed self-bonding liquid silicone rubber (0.005 g) is applied onto the center of the inner surface of the cap using a hand held adhesive dispensing system (Glenmarc-PD-2000). The septum is then inserted into the cap and approximately 20 psi pressure is applied to the septum for 1 second to hold it into the place. The final combination is then placed into a 175° C. oven for 5 minutes to allow the development of permanent bonding between septum and phenolic cap. The leak path between septum and cap is completely eliminated in the resulting fixture.

EXAMPLE 5

This Example illustrates the procedure to make a PTFE/silicone septa bonded polycarbonate cap. A 18 mm polycarbonate cap is provided. A 18 mm PTFE/silicone septum is cut from PTFE/silicone laminate described in Example 1. Pre-mixed self-bonding liquid silicone rubber (0.005 g) is applied onto the center of the inner surface of the cap using a hand held adhesive dispensing system (Glenmarc-PD-2000). The septum is then inserted into the cap and approximately 20 psi pressure is applied to the septa for 1 second to hold it into the place. The final combination is then placed into a 175° C. oven for 5 minutes to allow the development of permanent bonding between septum and polycarbonate cap. The leak path between septum and cap is completely eliminated in the resulting fixture.

EXAMPLE 6

This Example gives further details on the silicone adhesives used in this application: self-bonding liquid silicone rubber. Self-bonding LSR can be obtained commercially from silicone manufacture, i.e. Wacker, Shin-Etsu, or prepared according to the following procedure: 0.7 g of adhesion additive diethyl maleate is added into 100 g of liquid silicone rubber (Wacker LR3003/50, A+B) during the two part mixing step, using a dough mixer.

EXAMPLE 7

This Example illustrates the procedure to make PTFE/silicone septa bonded aluminum crimp cap. A 27 mm aluminum crimp cap with 10 mm hole on the top is provided. Partially cured silicone/PTFE laminate is prepared according to the following procedure: 400 g of Momentive Sanitech50 is mixed with 4 g Momentive CA6 and 0.66 g diethyl maleate using a two-roll mill. The resulting mixture is molded onto sodium naphthalene etched PTFE film at 250° F. for 4 minutes to form partially cured silicone/PTFE laminate, in which the surface of silicone remains tacky. PTFE/silicone septa (27 mm) are cut from this laminate by standard method. The septum is then inserted into the cap and approximately 20 psi pressure is applied to the septum for 1 second to hold it into the place. The final combination is then placed into a 175° C. oven for 5 minutes to allow the development of permanent bonding between septum and aluminum crimp cap. The leak path between septum and cap is completely eliminated in the resulting fixture.

EXAMPLE 8

This Example illustrates the procedure to make PTFE/silicone septa bonded stainless steel crimp cap. A 27 mm stainless steel crimp cap with 8 mm hole on the top is provided. Partially cured silicone/ PTFE laminate is prepared according to the following procedure described in Example 7. PTFE/silicone septa (27 mm) are cut from this laminate by standard method. The septum is then inserted into the cap and approximately 20 psi pressure is applied to the septum for 1 second to hold it into the place. The final combination is then placed into a 175° C. oven for 5 minutes to allow the development of permanent bonding between septum and stainless steel crimp cap. The leak path between septum and cap is completely eliminated in the resulting fixture.

EXAMPLE 9

This Example illustrates the procedure to make PTFE/silicone septa bonded phenolic cap. A 18 mm phenolic cap is provided. A 18 mm PTFE/silicone septum is cut from partially cured silicone/PTFE laminate prepared according to Example 7. The septum is then inserted into the cap and approximately 20 psi pressure is applied to the septum for 1 second to hold it into the place. The final combination is then placed into a 175° C. oven for 5 minutes to allow the development of permanent bonding between septum and phenolic cap. The leak path between septum and cap is completely eliminated in the resulting fixture.

EXAMPLE 10

This Example illustrates the procedure to make PTFE/silicone septa bonded polycarbonate cap. A 18 mm polycarbonate cap is provided. A 18 mm PTFE/silicone septum is cut from partially cured silicone/PTFE laminate prepared according to Example 7. The septum is then inserted into the cap and approximately 20 psi pressure is applied to the septum for 1 second to hold it into the place. The final combination is then placed into a 175° C. oven for 5 minutes to allow the development of permanent bonding between septum and polycarbonate cap. The leak path between septum and cap is completely eliminated in the resulting fixture.

EXAMPLE 11

This Example illustrates the procedure to measure the adhesion force between PTFE/silicone septa and caps in the septa bonded open top caps. A downward force is applied onto the septum from the top of the cap, using a cylindrical metal rod. The pressure on the metal rod is recorded using a Texture Analyser (Stable Micro System). The speed of the metal rod is 0.5 inch per minute; and the test results on the Examples is summarized in Table 1. The test on a control sample (control 1: septum/polypropylene cap, no adhesive; Control 2: septum/aluminum crimp cap, no adhesive) is also included in this Table for the purpose of comparison. The maximum de-bond pressure is taken from the maximum de-bond forces divided by the area of the metal rod. Each data point is taken from the average of five measurements.

TABLE 1

De-bond test on septum/open top cap combination

| Entry | Maximum de-bond pressure (psi) |
|---|---|
| Example 1 | 53.2 |
| Control 1 | 10.4 |
| Example 2 | 987.0 |
| Example 3 | 653.6 |
| Example 7 | 782.1 |
| Example 8 | 554.2 |
| Control 2 | 1.7 |

Cohesive failures are observed in the bonding test of Examples 2, 3, 7, and 8. Typically the de-bond pressure is greater than the strength of silicone/PTFE laminate and the test probe is pushed through the middle of septa.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A sealing assembly comprising:
   a cap having a top surface and a bottom surface;
   an adhesive layer including a self-bonding silicone composition directly in contact with the bottom surface of the cap, wherein the self-bonding silicone composition is a silicone polymer chemically modified with an adhesion promoter and the self-bonding silicone composition adheres directly to the bottom surface of the cap without a surface treatment or a primer between the self-bonding silicone composition and the bottom surface of the cap to enhance the adhesion between the cap and the adhesive layer; and
   a septum adjacent to the adhesive layer, wherein the septum includes at least one fluoropolymer layer.

2. The sealing assembly of claim 1, wherein the self-bonding silicone composition includes a polyalkylsiloxane and the adhesion promoter.

3. The sealing assembly of claim 2, wherein the polyalkylsiloxane is liquid silicone rubber (LSR) or high consistency gum rubber (HCR).

4. The sealing assembly of claim 1, wherein the self-bonding silicone composition is partially-cured.

5. The sealing assembly of claim 1, wherein the adhesion promoter includes a silsesquioxane, an ester of unsaturated aliphatic carboxylic acid, or mixture thereof.

6. The sealing assembly of claim 1, wherein the fluoropolymer includes polytetrafluoroethylene (PTFE).

7. The sealing assembly of claim 1, wherein the septum further includes a silicone layer disposed between the adhesive layer and the fluoropolymer layer.

8. The sealing assembly of claim 7, wherein the silicone layer includes a high consistency gum rubber (HCR).

9. The sealing assembly of claim 1, having a bond strength between the bottom surface of the cap and the septum of greater than about 30 psi.

10. A sealing assembly comprising:
    a cap having a top surface and a bottom surface; and
    a septum, wherein the septum includes an adhesive layer including a self-bonding silicone composition directly in contact with the bottom surface of the cap, wherein the self-bonding silicone composition is a silicone polymer chemically modified with an adhesion promoter and the self-bonding silicone composition adheres directly to the bottom surface of the cap without a surface treatment or a primer between the self-bonding silicone composition and the bottom surface of the cap to enhance the adhesion between the cap and the adhesive layer, and
    at least one fluoropolymer layer adjacent to the adhesive layer.

11. The sealing assembly of claim 10, wherein the self-bonding silicone composition includes a polyalkylsiloxane and the adhesion promoter.

12. The sealing assembly of claim 11, wherein the polyalkylsiloxane is high consistency gum rubber (HCR).

13. The sealing assembly of claim 12, wherein the high consistency gum rubber (HCR) is partially-cured.

14. The sealing assembly of claim 10, wherein the adhesion promoter includes a silsesquioxane, an ester of unsaturated aliphatic carboxylic acid, or mixture thereof.

* * * * *